(12) United States Patent
Oh et al.

(10) Patent No.: US 9,827,525 B2
(45) Date of Patent: Nov. 28, 2017

(54) AIR CONDITIONER

(71) Applicant: LG ELECTRONICS INC., Seoul (KR)

(72) Inventors: Jihye Oh, Seoul (KR); Beomsoo Seo, Seoul (KR); Jihoon Jun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 381 days.

(21) Appl. No.: 14/597,258

(22) Filed: Jan. 15, 2015

(65) Prior Publication Data

US 2015/0202559 A1    Jul. 23, 2015

(30) Foreign Application Priority Data

Jan. 17, 2014   (KR) .................. 10-2014-0006261

(51) Int. Cl.
*B01D 50/00* (2006.01)
*B01D 46/42* (2006.01)
(Continued)

(52) U.S. Cl.
CPC ........ *B01D 46/0065* (2013.01); *F24F 3/1603* (2013.01); *F24F 13/28* (2013.01); *B01D 2279/50* (2013.01); *F24F 2003/1639* (2013.01)

(58) Field of Classification Search
CPC ........ B01D 50/00; B01D 46/42; B01D 46/00; B01D 46/48; B01D 46/10; F28G 1/02; F28G 15/00; F24F 13/28
(Continued)

(56) References Cited

U.S. PATENT DOCUMENTS

2010/0043362 A1\* 2/2010 Okada ................... F24F 1/0007
                                                          55/296
2010/0107575 A1\* 5/2010 Zhang ................ B01D 46/0065
                                                          55/289
(Continued)

FOREIGN PATENT DOCUMENTS

EP      1 741 992 A2    1/2007
EP      2 154 441 A1    2/2010
(Continued)

OTHER PUBLICATIONS

European Search Report dated Jun. 2, 2015 issued in Application No. 15151473.4.

*Primary Examiner* — Jacob T Minskey
*Assistant Examiner* — Minh-Chau Pham
(74) *Attorney, Agent, or Firm* — KED & Associates, LLP

(57) ABSTRACT

An air conditioner is provided that includes a filter, a filter cleaning unit having a space formed therein to place foreign matter separated from the filter, a moving mechanism to make the filter cleaning unit move along the filter, the moving mechanism including a first gear having a closed loop section shape with gear teeth formed at at least one of an outside circumference or an inside circumference, a gear guide to guide the first gear to rotate while maintaining at least one linear portion, a second gear engaged with the first gear, a drive source to make the second gear rotate, a third gear engaged with the linear portion of the first gear, and a connection mechanism connected both to the third gear and the filter cleaning unit to make the filter cleaning unit move, thereby permitting to make the moving mechanism compact and enhancing reliability.

21 Claims, 10 Drawing Sheets

(51) Int. Cl.
*B01D 46/00* (2006.01)
*B01D 46/48* (2006.01)
*B01D 46/10* (2006.01)
*F24F 13/28* (2006.01)
*F28G 1/02* (2006.01)
*F28G 15/00* (2006.01)
*F24F 3/16* (2006.01)

(58) Field of Classification Search
USPC ............... 55/296, 429, 289, DIG. 3; 165/95
See application file for complete search history.

(56) References Cited

U.S. PATENT DOCUMENTS

2010/0116463 A1* 5/2010 Zhang .................. F24F 1/0007
165/95
2015/0114232 A1* 4/2015 Pan .................... B01D 46/0054
96/227

FOREIGN PATENT DOCUMENTS

EP          2 249 094 A1   11/2010
WO    WO 2009/028765 A2    3/2009
WO    WO 2010/052965 A1    5/2010

* cited by examiner

AIR CONDITIONER

CROSS-REFERENCE TO RELATED APPLICATION

This application claims priority under 35 U.S.C. §119 to Korean Application No. 10-2014-0006261 filed on Jan. 17, 2014, whose entire disclosure is incorporated herein by reference.

BACKGROUND OF THE INVENTION

1. Field of the Invention

The present invention relates to an air conditioner. More specifically, the present invention relates to an air conditioner having a filter cleaning unit mounted thereto for cleaning foreign matter from a filter.

2. Description of the Related Art

In general, the air conditioner can change a room to have a comfortable environment by drawing the air through an air inlet, changing a temperature, humidity, or cleanness of the air, and discharging the air to the room through an air outlet.

If the air conditioner is provided with a compressor, a condenser, an expansion device, and an evaporator, the air conditioner may cool or heat the room. If the air conditioner is provided with an air cleaner, the air conditioner may clean room air.

The air conditioner may have different kinds of air cleaners mounted thereto, and particularly, by mounting a filter which can filter out foreign matter from the air, the air conditioner may clean the room as the filter filters out the foreign matter from the air when the air conditioner is in operation. The filter may be separated from the air conditioner for cleaning, or replacing, the filter to maintain or manage the filter clean.

If there is much foreign matter at the filter, since air suction capability of the air conditioner will become poor, the filter is required to be cleaned or replaced, periodically.

It is a recent trend that a filter cleaning unit is mounted to the air conditioner for cleaning the filter to enhance convenience of use of the air conditioner.

SUMMARY OF THE INVENTION

It is an object of the present invention to provide an air conditioner which can minimize malfunction of movement of a filter cleaning unit and enhance reliability of the air conditioner.

It is another object of the present invention to provide an air conditioner which can clean a filter without a suction device which draws in foreign matter from a filter cleaning unit, has a simple structure and enables to make the air conditioner compact.

To achieve the object of the present invention, an air conditioner includes a filter, a filter cleaning unit having a space formed therein for placing foreign matter separated from the filter therein, a moving mechanism for making the filter cleaning unit to move along the filter, wherein the moving mechanism includes a first gear having a closed loop section shape with gear teeth formed at least one of an outside circumference and an inside circumference thereof, a gear guide for guiding the first gear to rotate while maintaining at least one linear portion, a second gear engaged with the first gear, a drive source for making the second gear to rotate, a third gear engaged with the linear portion of the first gear, and a connection mechanism connected both to the third gear and the filter cleaning unit for making the filter cleaning unit to move.

The gear guide may include an inner guide positioned on an inside of the first gear, and an outer guide for surrounding the outside circumference of the first gear.

The inner guide may include one pair of inner linear portions opposite to each other, and one pair of inner curved portions connecting the one pair of inner linear portions.

The inner guide may further include a partition plate portion for partitioning an inside space of the first gear into a first space the second gear is positioned therein and a second space the third gear is positioned therein.

The outer guide may include at least one outer linear portion facing the inner linear portion spaced from the inner linear portion.

The outer guide may have a pass through hole formed therein parallel to a moving direction of the filter cleaning unit for pass through of the connection mechanism.

The gear guide may further include a gear cover coupled to at least one of the inner guide and the outer guide for shading the first gear.

The drive source may be mounted to the gear cover.

The air conditioner may further include a supplementary moving mechanism arranged opposite to the moving mechanism connected to the moving mechanism with a shaft and connected to the filter cleaning unit.

The moving mechanism may further include a shaft connection gear engaged with the first gear, the shaft connection gear having the shaft connected thereto. The supplementary moving mechanism may include a first guide gear having a closed loop section with gear teeth formed on at least one of an outside circumference and an inside circumference thereof, a supplementary gear guide for guiding the first guide gear to rotate while maintaining at least one linear portion, a second guide gear engaged with the first guide gear connected to the shaft, a third guide gear engaged with the linear portion of the first guide gear, and a connection mechanism connected both to the third guide gear and the filter cleaning unit for making the filter cleaning unit to move.

The filter cleaning unit may include a dust box having the space formed therein, and a brush rotatably positioned at the dust box in contact with the filter, wherein the connection mechanism is connected to the brush to rotate the brush.

An exemplary embodiment of the connection mechanism may include a gear shaft having the third gear mounted thereto, a fourth gear mounted to the gear shaft, a fifth gear engaged with the fourth gear to be rotated in a direction opposite to the fourth gear, and a brush rotating shaft mounted to the fifth gear connected to the brush.

The gear shaft and the brush rotating shaft may be rotatably supported by the dust box.

Another exemplary embodiment of the connection mechanism may be a brush rotating shaft having the third gear mounted thereto, connected to the brush and rotatably supported by the dust box.

The dust box may include a dust box casing having a foreign matter inlet formed therein, and a separable case detachable from the dust box casing for putting the foreign matter in a space formed therein.

The dust box casing may have a supporting slit formed therein for rotatably supporting the connection mechanism.

The filter cleaning unit may further include a connection mechanism holder mounted to the dust box casing for preventing the connection mechanism from falling off, unintentionally.

The filter cleaning unit may further include a brush cleaner mounted to the dust box for separating the foreign matter from the brush.

The brush cleaner may be mounted to the separable case.

The air conditioner of the present invention permits to make the moving mechanism which moves the filter cleaning unit compact, and to enhance reliability.

And, the air conditioner of the present invention permits to minimize malfunction even in a case a size of the filter is large, and enables collect the foreign matter from the filter as the filter cleaning unit moves smoothly.

And, the air conditioner of the present invention permits to make stable movement of the filter cleaning unit while minimizing a number of the drive source owing to connection of the moving mechanism to the supplementary moving mechanism with a shaft.

And, the air conditioner of the present invention permits to minimize a number of the drive source which rotate the brush as well as make the dust box to move.

And, the air conditioner of the present invention permits to make the air conditioner compact while the second gear and the third gear are made not to interfere with each other.

And, the air conditioner of the present invention permits to make a structure thereof simple and a cost thereof low owing to the separable case which is separable from the dust box casing for service, and no necessity of a suction mechanism for drawing in the foreign matter from the filter cleaning unit.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In what follows, an air conditioner according to preferred embodiments of the present invention will be described in detail with reference to the appended drawings.

Figure 1:
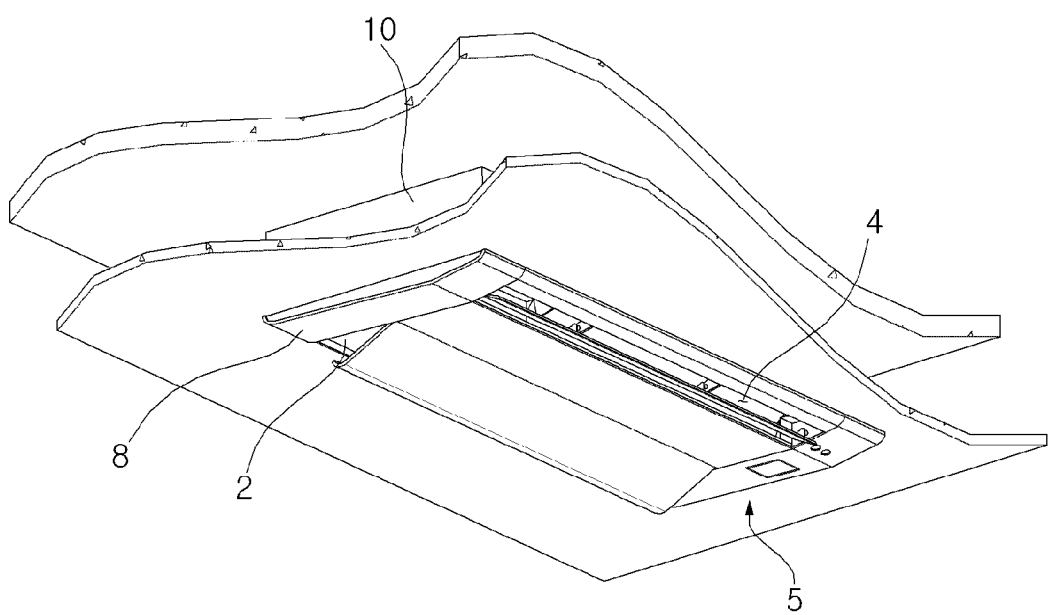
FIG. 1 is a perspective view illustrating an air conditioner in accordance with a preferred embodiment of the present invention.
Figure 2:
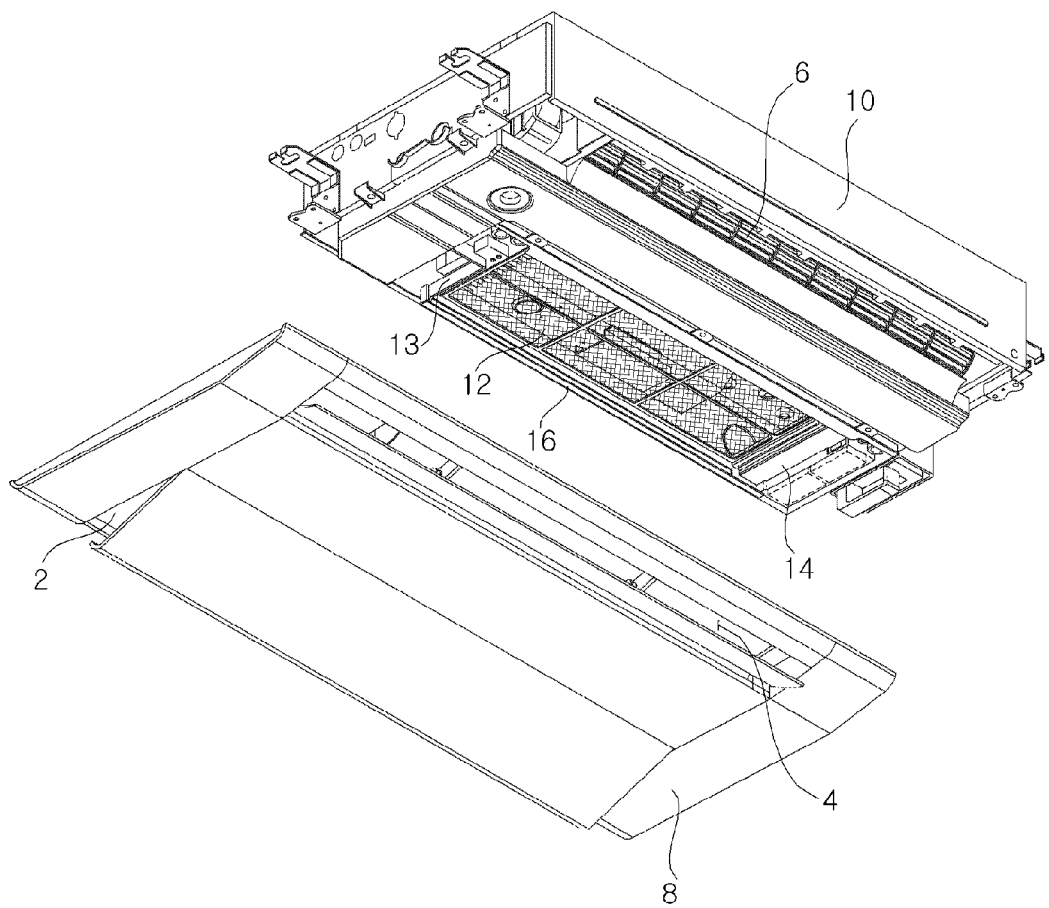
FIG. 2 is an exploded perspective view illustrating an inside of an air conditioner in accordance with a preferred embodiment of the present invention.
Figure 3:
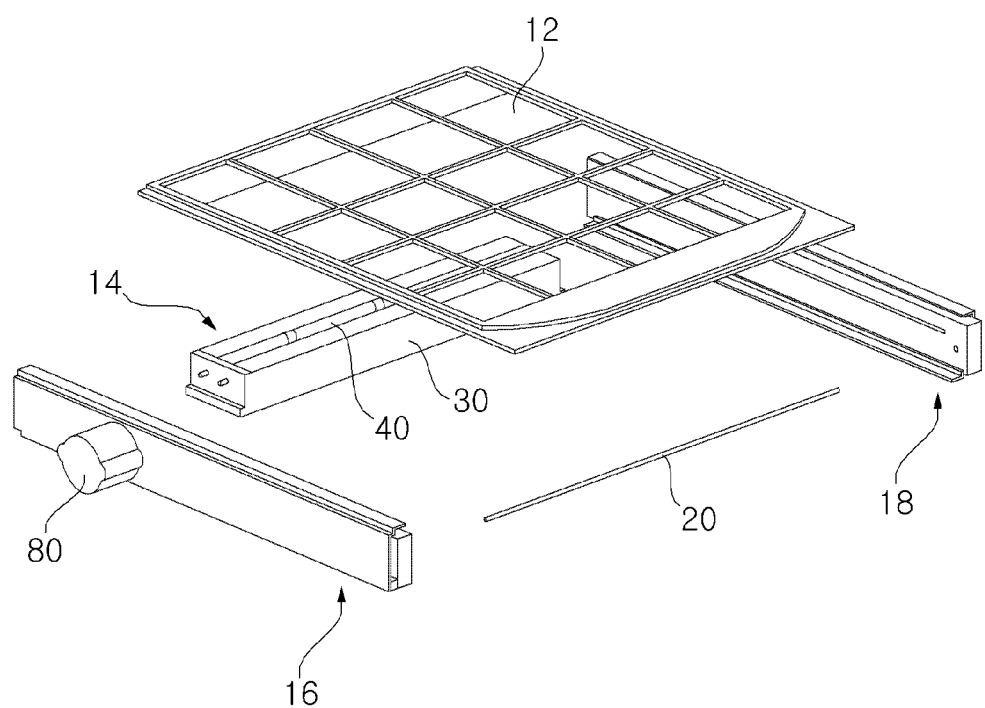
FIG. 3 is an exploded perspective view illustrating principal parts of an air conditioner in accordance with a preferred embodiment of the present invention.

FIG. 1 is a perspective view illustrating an air conditioner in accordance with a preferred embodiment of the present invention, FIG. 2 is an exploded perspective view illustrating an inside of an air conditioner in accordance with a preferred embodiment of the present invention, and FIG. 3 is an exploded perspective view illustrating principal parts of an air conditioner in accordance with a preferred embodiment of the present invention.

The air conditioner may include a body 5 having an air inlet 2 and an air outlet 4 formed therein, and a fan 6 may be mounted in the body 5. The air conditioner may have a heat exchanger (Not shown) mounted in the body 5 for making refrigerant to heat exchange with air. The air conditioner includes a filter 12 for filtering out foreign matter from the air drawn through the air inlet 2.

When the fan 6 is driven, room air may be drawn through the air inlet 2 and pass through the filter 12, and the foreign matter may be filtered out from the air by the filter 12. The air passed through the filter 12 thus may be heat exchanged at the heat exchanger, and thereafter, may be discharged to the room through the air outlet 4.

The filter 12 may be positioned between the air inlet 2 and the fan 6 in view of an air flow direction. The filter 12 may have at least a portion thereof arranged to face the air inlet 2. The filter 12 may have the foreign matter accumulated thereon from the air. The foreign matter accumulated thus may be cleaned by a filter cleaning unit 14 mounted to the air conditioner itself.

The filter cleaning unit 14 may be in contact with the filter 12 and separates the foreign matter from the filter 12 as the filter cleaning unit 14 moves along the filter 12. The filter cleaning unit 14 may have a space formed therein for putting the foreign matter separated from the filter 12 therein. The filter cleaning unit 14 may receive the foreign matter separated from the filter 12 and hold the foreign matter in the space. The foreign matter separated from the filter 12 may be put in the filter cleaning unit 14, and move with the filter cleaning unit 14.

The filter cleaning unit 14 may be connected to the moving mechanism 16 for cleaning the filter 12 as the filter cleaning unit 14 is moved by the moving mechanism 16.

The filter cleaning unit 14 may be connected both to the moving mechanism 16 and a moving guide such that the filter cleaning unit 14 may be guided by the moving guide when the filter cleaning unit 14 is moved by the moving mechanism 16. The filter cleaning unit 14 may be positioned between the moving mechanism 16 and the moving guide, for cleaning the filter 12 while moving between the moving mechanism 16 and the moving guide.

The filter cleaning unit 14 may be connected both to the moving mechanism 16 and the supplementary moving mechanism 18 such that the filter cleaning unit 14 is moved by the moving mechanism 16 and the supplementary moving mechanism 18. The moving mechanism 16 may make the filter cleaning unit 14 to move, and the supplementary moving mechanism 18, interlocked with the moving mechanism 16, may make the filter cleaning unit 14 to move together with the moving mechanism 16. The filter cleaning unit 14 may be positioned between the moving mechanism 16 and the supplementary moving mechanism 18, for cleaning the filter 12 while moving therebetween. In this case the supplementary moving mechanism 18 is arranged opposite to the moving mechanism 16 to make the filter cleaning unit 14 to move, together with the moving mechanism 16.

In the air conditioner, each of the moving mechanism 16 and the supplementary moving mechanism 18 includes a drive source 80 to be described later for making the filter cleaning unit 14 to move by driving the drive source 80 of the moving mechanism 16 and the drive source of the supplementary moving mechanism 18 altogether. In this case, the moving mechanism 16 and the supplementary moving mechanism 18 may have the same structure, only with a difference of mounted positions.

The air conditioner may have the moving mechanism 16 and the supplementary moving mechanism 18 connected with a shaft 20, and, of the moving mechanism 16 and the supplementary moving mechanism 18, only the moving mechanism 16 may include the drive source 80. If the drive source 80 of the moving mechanism 16 is put into operation, the moving mechanism 16 makes the filter cleaning unit 14 to move, and the shaft 20 may operate the supplementary moving mechanism 18. It is possible that the supplementary moving mechanism 18, interlocked to the shaft 20, may make the filter cleaning unit 14 to move. In this case, the moving mechanism 16 may be a first moving mechanism that moves the filter cleaning unit 14, and the supplementary moving mechanism 18 may be a second moving mechanism that moves the filter cleaning unit 14 interlocked to the moving mechanism 16. It is preferable that the air conditioner has a number of the drive sources 80 minimized. That is, it is preferable that, in the air conditioner, only the moving mechanism 16 includes the drive source 80, the supplementary moving mechanism 18 does not include the drive source 80, and the moving mechanism 16 and the supplementary moving mechanism 18 are connected with the shaft 20 so that the moving mechanism 16 and the supplementary moving mechanism 18 move the filter cleaning unit 14, altogether. The moving mechanism 16 may move the filter cleaning unit 14, if an accumulated operation time period of the air conditioner passes a set time period, if a user or the like inputs a filter cleaning order, or at fixed time intervals, and the filter cleaning unit 14 can clean the filter 12, automatically. It is possible that the moving mechanism 16 moves the filter cleaning unit 14 one time only in one direction linearly, one time in both directions linearly, or a plurality of times in both directions, linearly.

The air conditioner may be any one of a ceiling type air conditioner, a wall mounting type air conditioner, and a stand type air conditioner, and the present invention will be described taking the ceiling type air conditioner as an example. Since the ceiling type air conditioner has a mounted height higher than the wall mounting type air conditioner, or the stand type air conditioner, it is not easy to remove the foreign matter from the filter 12 manually, and therefore, it is preferable that the ceiling type air conditioner itself collects the foreign matter from the filter 12.

The air conditioner may include a base panel 8 having the air inlet 2 and the air outlet 4 formed therein, and a casing 10 having the fan 6 and the heat exchanger arranged therein. The base panel 8 may be arranged on a lower side of the casing 10, and may be exposed to the room. The casing 10 may be mounted to be positioned in the ceiling in the room, and different air conditioner components, such as the fan 6, the heat exchanger, may be mounted therein.

The air conditioner may further include a filter frame 13 for arranging the filter 12 thereto. The filter frame 13 may be mounted to be positioned at a lower side of an inside of the casing 10. When the base panel 8 is mounted to the casing 10, the filter frame 13 may be positioned above the base panel 8.

The filter 12 may be arranged in the air conditioner horizontally, and the filter cleaning unit 14 may move along an underside area of the filter 12 horizontally to separate the foreign matter from the filter 12, and may receive and hold the foreign matter separated from the filter 12 therein.

Figure 4:
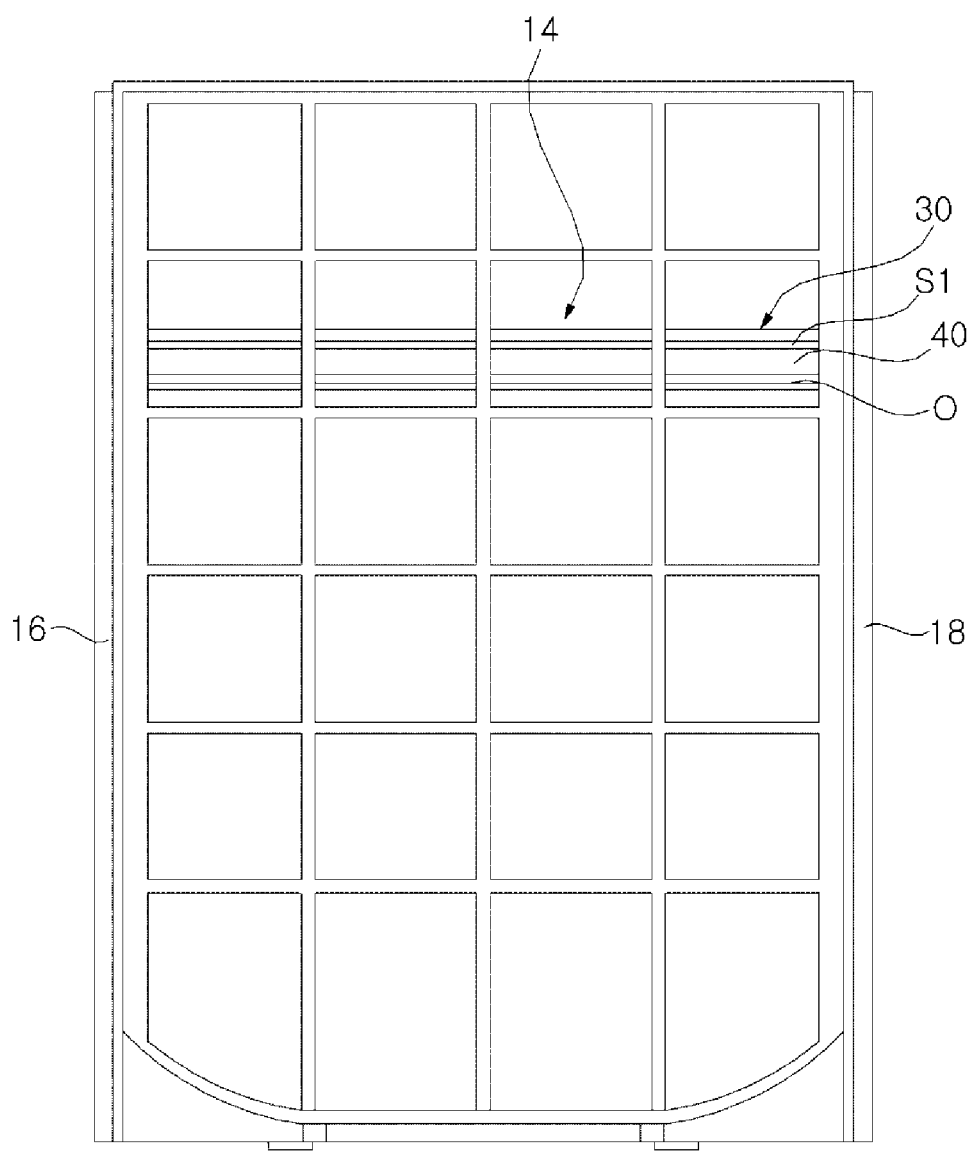
FIG. 4 is a plan view illustrating a case when a filter cleaning unit is cleaning a filter in an air conditioner in accordance with a preferred embodiment of the present invention.
Figure 5:
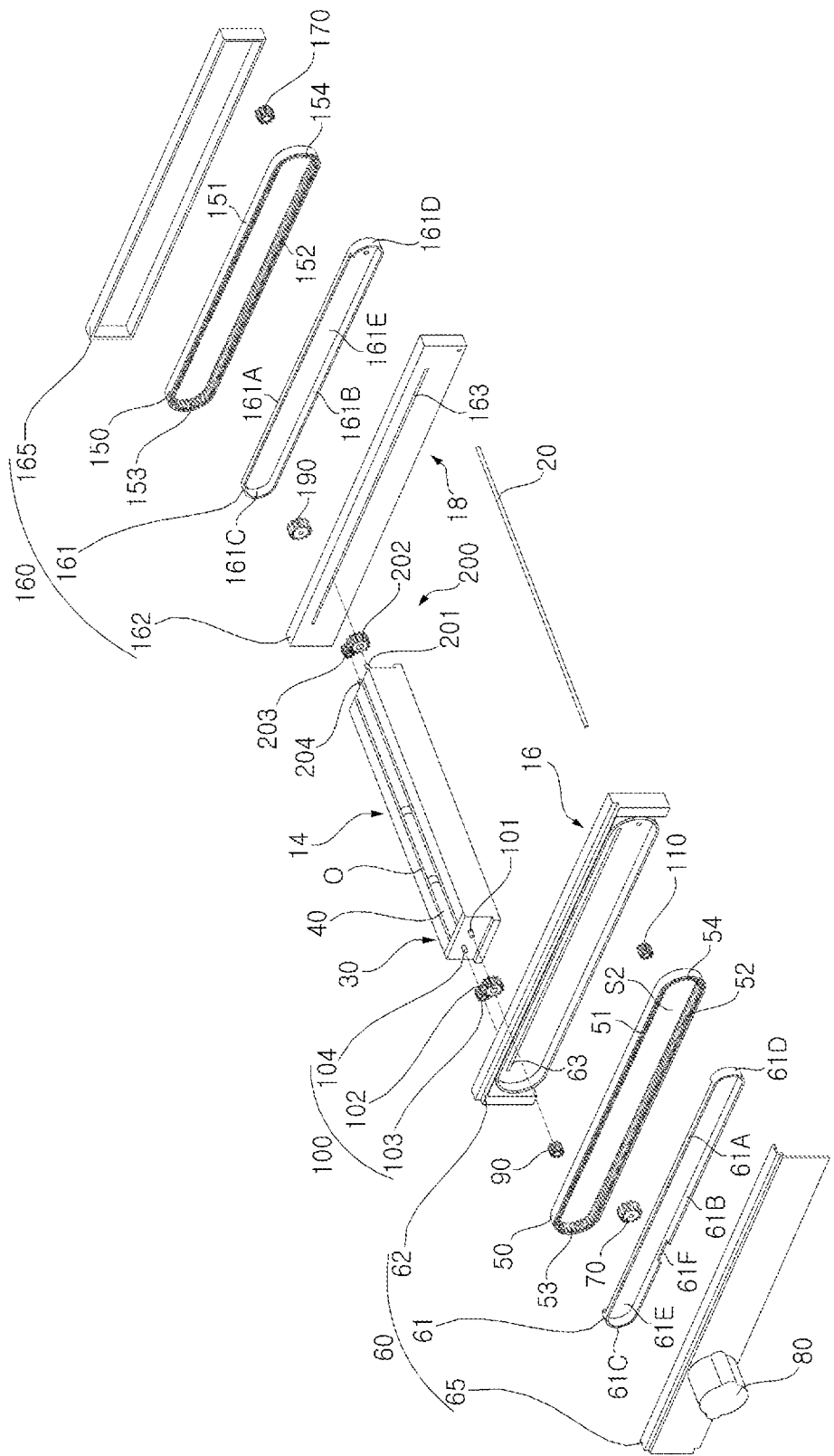
FIG. 5 is an exploded perspective view illustrating a moving mechanism and a supplementary moving mechanism in an air conditioner in accordance with a preferred embodiment of the present invention.
Figure 6:
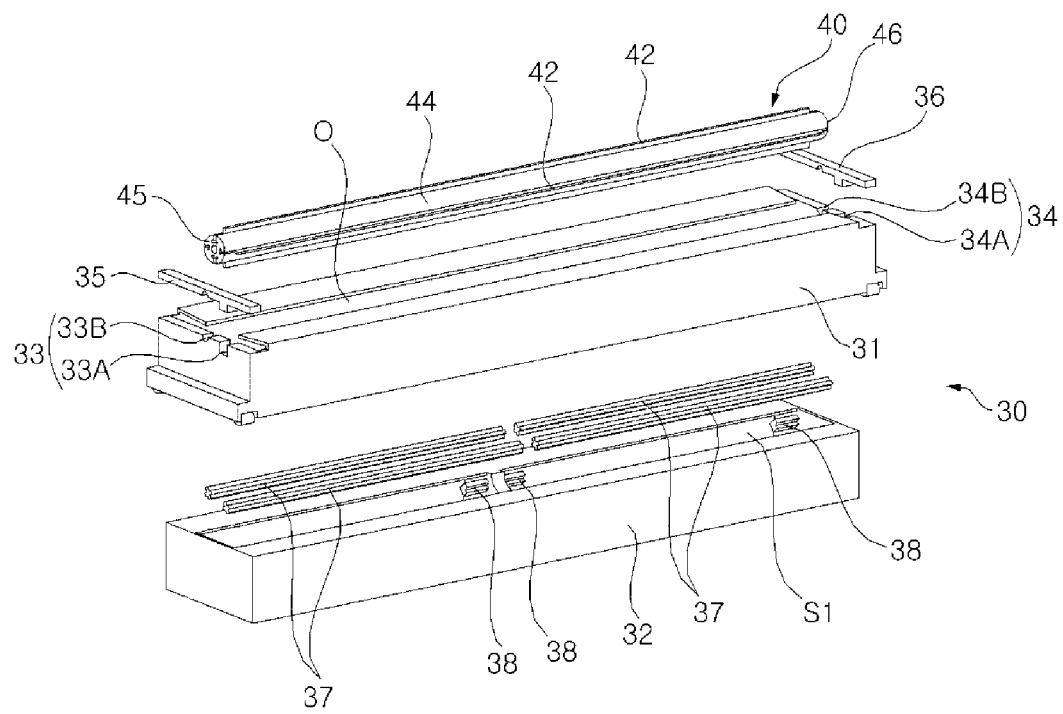
FIG. 6 is an exploded perspective view illustrating a filter cleaning unit in an air conditioner in accordance with a preferred embodiment of the present invention.
Figure 7:
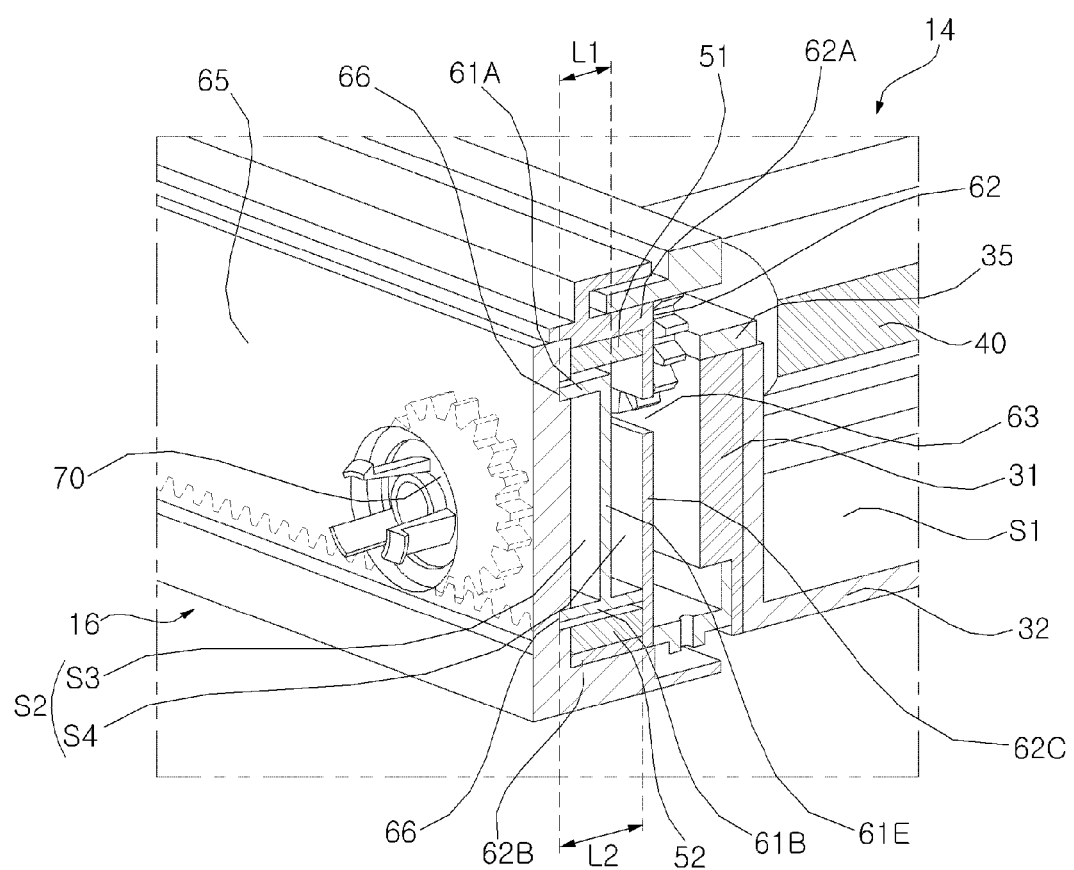
FIG. 7 is a perspective view illustrating a moving mechanism in an air conditioner in accordance with a preferred embodiment of the present invention, with a partial cut away view.
Figure 8:
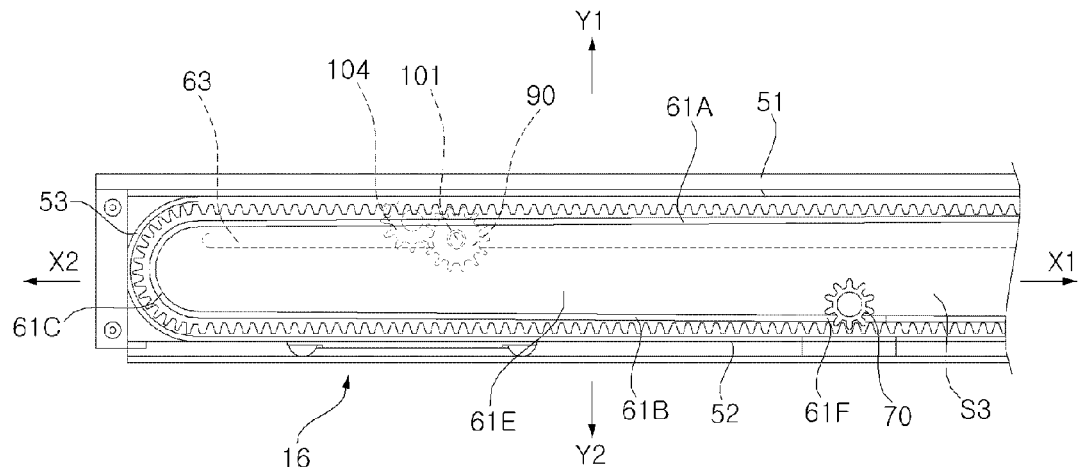
FIG. 8 is an enlarged side view illustrating principal parts of a moving mechanism in an air conditioner in accordance with a preferred embodiment of the present invention.
Figure 9:
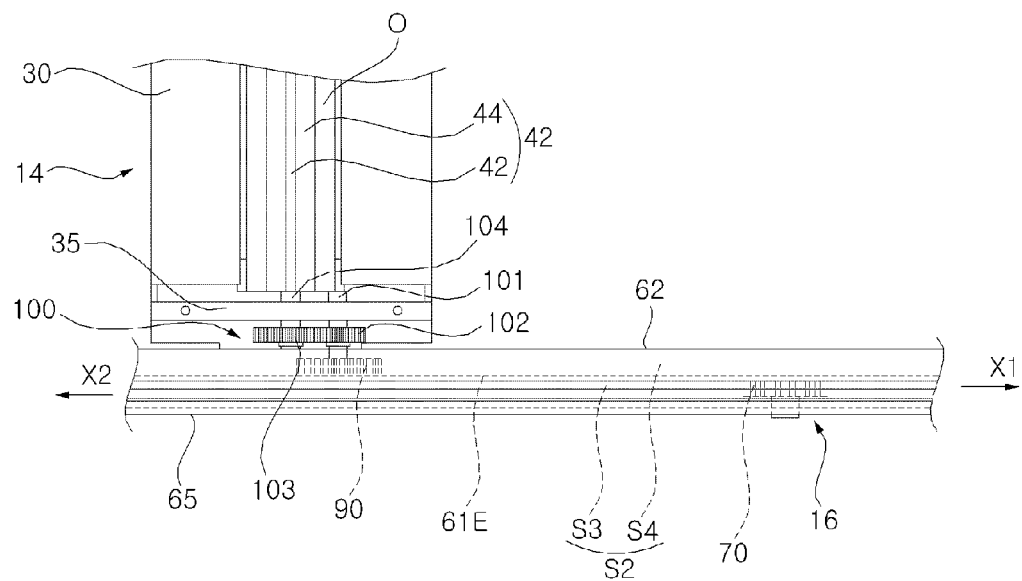
FIG. 9 is an enlarged plan view illustrating principal parts of a moving mechanism in an air conditioner in accordance with a preferred embodiment of the present invention.

FIG. 4 is a plan view illustrating a case when a filter cleaning unit is cleaning a filter in an air conditioner in accordance with a preferred embodiment of the present invention, FIG. 5 is an exploded perspective view illustrating a moving mechanism and a supplementary moving mechanism in an air conditioner in accordance with a preferred embodiment of the present invention, FIG. 6 is an exploded perspective view illustrating a filter cleaning unit in an air conditioner in accordance with a preferred embodiment of the present invention, FIG. 7 is a perspective view illustrating a moving mechanism in an air conditioner in accordance with a preferred embodiment of the present invention, with a partial cut away view, FIG. 8 is an enlarged side view illustrating principal parts of a moving mechanism in an air conditioner in accordance with a preferred embodiment of the present invention, and FIG. 9 is an enlarged plan view illustrating principal parts of a moving mechanism in an air conditioner in accordance with a preferred embodiment of the present invention.

The filter cleaning unit 14 may have a space S1 formed therein for putting the foreign matter dropped from the filter 12 therein. When being moved by the moving mechanism 16, the filter cleaning unit 14 may be moved while in contact with the filter 12. The filter cleaning unit 14 includes a dust box 30 having the space S1 formed therein for holding the foreign matter, and a brush 40 rotatably positioned at the dust box 30 in contact with the filter 12.

It is possible that the dust box 30 may be constructed of one member, or of a plurality of members. The dust box 30 may include a dust box casing 31 having a foreign matter inlet O formed therein, and a separable case 32 detachable from the dust box casing 31 to have the space S1 formed therein for putting the foreign matter therein. The dust box casing 31 may maintain a state in which the dust box casing 31 is positioned in the air conditioner, and the separable case 32 may be mounted to the dust box casing 31 for collecting the foreign matter, and may discharge the foreign matter collected thus after the separable case 32 is separated from the dust box casing 31.

The dust box casing 31 may couple to the separable case 32. The dust box casing 31 may support the separable case 32. The dust box casing 31 may have a detachable portion formed thereon for mounting/dismounting the separable case 32 thereto/therefrom. The separable case 32 may be mounted/dismounted to/from the dust box casing 31 with a hook, an inserting rib, or a fastening member, such as a screw. The dust box casing 31 may have a separable case opening formed therein for putting the separable case 32 in/out of the dust box casing 31. The dust box casing 31 may have a foreign matter inlet O formed in a side facing the filter 12, and the separable case opening formed on a side except the side facing the filter 12. The separable case 32 may be placed in the dust box casing 31, and the dust box casing 31 may function as a separable case protective case for protecting the separable case 32. The dust box 30 may move a lower area of the filter 12 linearly, and the dust box casing 31 may have the foreign matter inlet O formed in an upper side thereof, and the separable case opening formed in a side except the upper side. The dust box casing 31 may have the separable case opening formed in a bottom side thereof, and the separable case 32 may be mounted/dismounted to/from the dust box casing 31 in a vertical direction. The dust box casing 31 may be a separable case housing which surrounds a front, a rear, a left side and right side of the separable case 32. The dust box casing 31 may have the foreign matter inlet O formed, throughout an entire surface of an upper side thereof, or in a portion of the upper side. The foreign matter inlet O may be formed larger than the brush 40, and the brush 40 may be separated from the dust box casing 31 passed through the foreign matter inlet O. The dust box casing 31 may have a box shape having an opened bottom side, and may have the foreign matter inlet O formed in a portion of the upper side. The foreign matter inlet O may extend in a direction perpendicular to a moving direction of the filter cleaning unit 14.

The separable case 32 may be placed in the dust box casing 31 through the separable case opening, and may be taken out of the dust box casing 31 through the separable case opening. The separable case 32 may have the foreign matter opening formed therein for in/out of the foreign matter, and may have the space S1 formed therein. The separable case 32 may have a box shape having an opened upper side, and may have the foreign matter opening formed in the upper side. The separable case 32 may have an entire upper side opened to form the foreign matter opening, or a portion of the upper side opened to form the foreign matter opening. The foreign matter dropped from the filter 12 may drop to the space S1 in the separable case 32 through the foreign matter inlet O in the dust box casing 31, and held in the space S1 in the separable case 32. The separable case 32 may be separated from the dust box casing 31 by a user or a service man, for discharging the foreign matter accumulated in the space S1 to an outside of the separable case 32. The separable case 32 may be separated from the dust box casing 31 in a state the dust box casing 31 is connected to the moving mechanism 16 and the supplementary moving mechanism 18, and the user or the service man may dispose the foreign matter accumulated in the space S1 in the separable case 32 with a simple work of separating the separable case 32 from the dust box casing 31.

Formed at least one of the dust box casing 31 and the separable case 32, there may be supporting slit 33 and 34 formed therein for rotatably supporting connection mechanisms 100 and 200 to be described, later. The supporting slit 33 and 34 may be formed matched to the dust box casing 31 and the separable case 32 respectively, or may be formed only one of the two. The supporting slit 33 and 34 may include a moving mechanism supporting slit 33 formed on one side of the dust box casing 31 for rotatably supporting the connection mechanism 100 of the moving mechanism 16. The supporting slit 33 and 34 may include a supplementary moving mechanism supporting slit 34 formed on the other side of the dust box casing 31 for rotatably supporting the connection mechanism 200 of the supplementary moving mechanism 18.

The filter cleaning unit 14 may further include a connection mechanism holder 35 and 36 mounted to the dust box casing 31 for preventing the connection mechanism 100 and 200 from falling off the dust box casing 31, unintentionally. The connection mechanism holder 35 and 36 may further include a first holder 35 arranged at the dust box casing 31 for preventing the connection mechanism 100 of the moving mechanism 16 from falling off, unintentionally. The first holder 35 may have a slit formed therein matched to the moving mechanism supporting slit 33, and the slit formed in the first holder 35 may surround at least a portion of the connection mechanism 100. The connection mechanism holder 35 and 36 may include a second holder 36 arranged at the dust box casing 31 for preventing the connection mechanism 200 of the supplementary moving mechanism 18 from falling off, unintentionally. The second holder 36 may have a slit formed matched to the supplementary moving mechanism supporting slit 34, and the slit of the second holder 36 may surround at least a portion of the connection mechanism 200.

The filter cleaning unit 14 may further include a brush cleaner 37 mounted to the dust box 30 for separating the foreign matter from the brush 40. The brush cleaner 37 may include at least one projection to be brought into contact with the brush 40. The brush cleaner 37 may be mounted/dismounted to/from the dust box 30, and may be separated from the dust box 30 at the time of cleaning or service. The dust box 30 may have a brush cleaner mounting/dismounting portion 38 formed thereon for mounting/dismounting the brush cleaner 37 thereto/therefrom. The brush cleaner mounting/dismounting portion 38 may be mounted to the separable case 32. The brush cleaner mounting/dismounting portion 38 may be formed in the separable case 32. The brush cleaner mounting/dismounting portion 38 may be a hook, a rib or the like for mounting the brush cleaner 37 thereto. The brush cleaner 37 has a size smaller than the foreign matter opening in the separable case 32, for the brush cleaner 37 to be in/out of the separable case 32 through the foreign matter opening in the separable case 32. The brush cleaner 37 may be separated from the separable case 32 at the time of cleaning or service. The brush cleaner 37 may move together with the separable case 32, and the brush cleaner 37 may move together with the separable case 32 when the separable case 32 is separated thus. The brush cleaner 37 may be arranged to be positioned in the space S1 of the separable case 32. The foreign matter stuck to the brush 40 may be separated from the brush 40 when the brush 40 is brought into contact with the brush cleaner 37, and the foreign matter separated from the brush 40 thus may be put in the space S1. A plurality of the brush cleaners 37 may be arranged at the separable case 32.

The brush 40 may include a brush body 42 to be brought into contact with the filter 12. The brush 40 may include a brush holder 44 having the brush body 42 mounted thereto. The brush holder 44 may be positioned in the dust box 30.

The brush body 42 may be arranged projected from the brush holder 44 to rotate when the brush holder 44 rotates. The brush body 42 may have one end connected to the bush holder 44 and the other end of a free end. The brush body 42 may be formed of an elastic material which deforms and restores elastically. A plurality of the brush bodies 42 may be provided to the brush holder 44. It is possible that the brush body 42 extends in a direction perpendicular to a length direction of the brush holder 44, or extends in a direction parallel to the length direction of the brush holder 44. The brush body 42 may rotate to a position at which the brush body 42 passes through the foreign matter inlet O or to a position at which the brush body 42 is in contact with the brush cleaner 37. At the position the brush body 42 passes through the foreign matter inlet O, the brush body 42 is in contact with the filter 12 to separate the foreign matter from the filter 12. At the position the brush body 42 is in contact with the brush cleaner 37, the foreign matter stuck to the brush body 42 may be separated by the brush cleaner 37, and the foreign matter separated from the brush body 42 thus may be put in the space S1 in the filter cleaning unit 14.

The brush holder 44 may be formed to have a long bar shape, and may be rotated connected to the moving mechanism 16 and the supplementary moving mechanism 18. The brush holder 44 may be a rotation axis of the brush 40. The brush holder 44 may have one side with a moving mechanism connection 45 formed thereon connected to the moving mechanism 16, and the other end with a supplementary moving mechanism connection 46 formed thereon connected to the supplementary moving mechanism 18.

The moving mechanism 16 will be described in more detail.

The moving mechanism 16 may make the filter cleaning unit 14 to move along the filter 12. The moving mechanism 16 may include a first gear 50 having a closed loop section shape with gear teeth formed on at least one of an inside circumference or an outside circumference thereof, a gear guide 60 for guiding the first gear 50 to rotate while maintaining at least one linear portion, a second gear 70 engaged with the first gear 50, a drive source 80 for rotating the second gear 70, a third gear 90 engaged with the linear portion of the first gear 50, and a connection mechanism 100 connected to the third gear 90 and the filter cleaning unit 14 for making the filter cleaning unit 14 to move, linearly.

The first gear 50 may rotate following the gear guide 60 guided by the gear guide 60. The first gear 50 may rotate following a locus formed on the gear guide 60. If the first gear 50 includes only one linear portion 51, the third gear 90 may engage with the one linear portion 51. The first gear 50 may rotate while maintaining at least two linear portions 51 and 52. If the first gear 50 includes two linear portions 51 and 52, the third gear 90 may engage with one 51 of the two linear portions 51 and 52. The first gear 50 may also include three or more than three linear portions. In this case, the third gear 90 may engage with one 51 of the three or more than three linear portions. The longer the linear portion 51 engaged with the third gear 90, the larger a moving width of the filter cleaning unit 14, and vice versa. The linear portion 51 of the first gear 50 the third gear 90 is engaged therewith may extend in a direction parallel to the direction the filter cleaning unit 14 moves. The first gear 50 may include one pair of linear portions 51 and 52 and one pair of curved portions 53 and 54. The one pair of the linear portions 51 and 52 may parallel opposite to each other. The one pair of curved portions 53 and 54 may be positioned opposite to each other. The first gear 50 may have a shape thereof fixed, and maintained, by the gear guide 60. The first gear 50 may be maintained to have a rectangular shape parallel to the moving direction of the filter cleaning unit 14. The first gear 50 may rotate while maintaining a rectangular shape parallel to the moving direction of the filter cleaning unit 14. Each of the one pair of the linear portions 51 and 52 may be positioned extended in a length direction parallel to the moving direction of the filter cleaning unit 14. In the air conditioner, the third gear 90 may engage with one 51 of the pair of the linear portions 51 and 52, and the second gear 70 may engage with the other one 52 of the pair of the linear portions 51 and 52. When the second gear 70 rotates, while the first gear 50 maintains the rectangular shape in a direction parallel to the moving direction of the filter cleaning unit 14, the one pair of the linear portions 51 and 52 may advance in directions opposite to each other and the third gear 90 may move linearly following one 51 of the pair of the linear portions 51 and 52. The third gear 90 may move linearly in a direction parallel to the length direction of the linear portion 51 the third gear 90 is engaged therewith. The first gear 50 may have the gear teeth formed on the inside circumference thereof and the second gear 70 and the third gear 90 may rotate in an inside space S2 the first gear 50 forms.

The gear guide 60 may include an inner guide 61 positioned on an inside of the first gear 50, and an outer guide 62 surrounding the outside circumference of the first gear 50. The inside circumference of the first gear 50 may face an outside circumference of the inner guide 61. An outside circumference of the first gear 50 may face an inside circumference of the outer guide 62. The first gear may rotate following a locus of a space formed between the inner guide 61 and the outer guide 62.

The inner guide 61 may be formed to have a rectangular shape parallel to the moving direction of the filter cleaning unit 14. The inner guide 61 may guide the inside circumference of the first gear 50. The inner guide 61 may be formed to have a size smaller than the first gear 50. The inner guide 61 may be positioned in an inside space S2 which is a space the inside circumference of the first gear 50 forms.

The inner guide 61 may include opposite one pair of inner linear portions 61A and 61B. The inner guide 61 may include one pair of inner curved portions 61C and 61D connecting the one pair of inner linear portions 61A and 61B. The inner guide 61 may include a partition plate portion 61E which partitions the inside space S2 of the first gear 50. The partition plate portion 61E may partition the inside space S2 of the first gear 50 into a first space S3 in which the second gear 70 is positioned, and a second space S4 in which the third gear 90 is positioned. The one pair of inner linear portions 61A and 61B and the one pair of inner curved portions 61C and 61D may be formed along an outside circumference of the partition plate portion 61E.

The one pair of inner linear portions 61A and 61B may be formed spaced from each other. One 61A of the one pair of inner linear portions 61A and 61B may face one 51 of the linear portions of the first gear 50. The other one 61B of the linear portions may face the other one 52 of the linear portions of the first gear 50. The one pair of inner linear portions 61A and 61B may have the same lengths. One 61A of the one pair of inner linear portions 61A and 61B may have a width L1 smaller than a width L2 of the other one 61B. In the one pair of inner linear portions 61A and 61B, one of an upper side and a lower side of the space S4 in which the third gear 90 is positioned may be opened. In the linear portion 61A having a smaller width of the one pair of inner linear portions 61A and 61B, one of an upper side and a lower side of the space S4 in which the third gear 90 is positioned may be opened. An avoiding portion 61F may be formed on the other one 61B of the one pair of inner linear portions 61A and 61B for avoiding the second gear 70. The avoiding portion 61F may be formed at the inner linear portion 61B having a larger width of the one pair of inner linear portions 61A and 61B. The avoiding portion 61F may be formed in a shape recessed in the other one 61B of the one pair of inner linear portions 61A and 61B. Of the one pair of inner linear portions 61A and 61B, an upper inner linear portion 61A positioned on an upper side thereof may have a width L1 smaller than a width L2 of a lower inner linear portion 61B positioned on a lower side thereof, and the avoiding portion 61F may be formed recessed in the lower side inner linear portion 61B. Opposite to this, of the one pair of inner linear portions 61A and 61B, the avoiding portion 61F may be formed recessed in the upper side inner linear portion 61A positioned on an upper side thereof, and the lower side inner linear portion 61B may have the width smaller than the width of the upper side inner linear portion 61A.

The one pair of inner curved portions 61C and 61D may be formed opposite to each other. Each of the one pair of inner linear portions 61A and 61B may be formed in a semi-circular shape.

The partition plate portion 61E may assist the second gear 70 and the third gear 90 to rotate in spaces separated from each other, and make a size of the moving mechanism 16 compact as much as possible.

The outer guide 62 may guide the outside circumference of the first gear 40. The outer guide 62 may include at least one outer linear portion 62A and 62B, which is opposite to, and spaced from, the inner linear portions 61A and 61B. The at least one outer linear portion 62A and 62B may be formed in a rectangular shape in a direction parallel to the moving direction of the filter cleaning unit 14. The outer guide 62 may further include an outer plate portion 62C having at least one outer linear portion 62A and 62B projected therefrom. The outer plate portion 62C may form an exterior appearance of one side of the moving mechanism 16. The outer guide 62 may have a pass through hole 63 through which the connection mechanism passes formed parallel to the moving direction of the filter cleaning unit 14. The pass through hole 63 may extend in the outer plate portion 62C.

The gear guide 60 may further include a gear cover 65 for shading the first gear 50. The gear cover 65 is coupled with the outer guide 62 to cover the inside space S2. The gear cover 65 may form an exterior appearance of the moving mechanism 16 together with the outer guide 62. The gear cover 65 may face the outer plate portion 62C of the outer guide 62, and the gear cover 65 may form an exterior appearance of the other side of the moving mechanism 16. The gear cover 65 may have an inner guide inserting groove 66 formed therein for inserting the inner guide 61 therein. The inner guide inserting groove 66 may be formed to insert the one pair of inner linear portions 61A and 61B and the one pair of inner curved portions 61C and 61D therein.

The gear guide 60 may have the outer guide 62 and the gear cover 65 to function as a case of the moving mechanism 16. The inner guide 61 may be positioned between the outer guide 62 and the gear cover 65, for guiding rotation of the first gear 50 and partitioning the inside space S2 of the first gear 50 into the first space S3 and the fourth space S4. The gear guide 60 may have the gear cover 65, the inner guide 61 and the outer guide 62 fastened with a fastening member, such as a screw or the like. Each of the gear cover 65, the inner guide 61 and the outer guide 62 may have fastening holes formed therein for passing through of fastening members, such as screws.

The second gear 70 may be a drive gear for rotating the first gear 50. The second gear 70 may be rotated by the drive source 80, for transmission of driving power of the drive source 80 to the first gear 50. The second gear 70 may rotate in a state secured to the drive source 80 without changing a position thereof, and when the second gear 70 rotates, the linear portion of the first gear 50 may move linearly according to the second gear 70. If the third gear 90 is connected to the linear portion 51 positioned on the upper side of the one pair of the linear portions 51 and 52, the second gear 70 may be connected to the linear portion 52 positioned on the lower side of the one pair of the linear portions 51 and 52. If the third gear 90 is connected to the linear portion 52 positioned on the lower side of the one pair of the linear portions 51 and 52, the second gear 70 may be connected to the linear portion 51 positioned on the upper side of the one pair of the linear portions 51 and 52. The second gear 70 may have at least one portion positioned in the first space S3 of the inside space S2 of the first gear 50. The second gear 70 may have a gear portion having gear teeth formed thereon engaged with the first gear 50 in the first space S3.

The drive source 80 may be mounted to the gear cover 65. The gear cover 65 may protect the first gear 50 and the second gear 70 as well as function as a mounting member of the drive source. The drive source 80 may be mounted to be positioned to an outside of a space the gear cover 65 and the outer guide 62 form. The drive source 80 may include a motor having a rotation shaft connected to the second gear 70, and the motor may have an electric cable connected thereto. The drive source 80 may be mounted to have a position fixed to the gear cover 65 of which position is fixed, and the electric cable connected to the motor may be lead, easily. If the drive source 80 is mounted to the filter cleaning unit 14 which moves directly, the leading of the electric cable is not easy. If the drive source 80 is mounted to the gear cover 65, the leading of the electric cable is easy and arrangement of the electric cable becomes compact.

The third gear 90 may be a moving gear moving following the first gear 50 while being rotated by the first gear 50. The third gear 90 may be a driven gear for transmission of a torque from the first gear 50 to the connection mechanism 100 when the first gear 50 rotates. The third gear 90 may have at least a portion thereof positioned in the second space S4 of the inside space S2 of the first gear 50. The third gear 90 may have a gear portion having gear teeth formed thereon engaged with the first gear 50 in the second space S4.

The connection mechanism 100 may be connected to at least one of the dust box 30 and the brush 40 for moving the filter cleaning unit 14. The connection mechanism 100 may be connected, not to the brush 40, but to the dust box 30. In this case, in order to make more efficient filter 12 cleaning, a separate brush drive mechanism for rotating the brush 40 may be required additionally, many components may be required, and a structure thereof may become complicate. Opposite to this, the connection mechanism 100 may be connected to the brush 40. In this case, the connection mechanism 100 may move the brush 40 linearly while rotating the brush 40, and the dust box 30 may move linearly together with the brush 40. It is preferable that the connection mechanism 100 is connected to the brush 40 for rotating the brush 40. It is most preferable that the connection mechanism 100 is connected both to the brush 40 and the dust box 30 together for moving the brush 40 while rotating the same, and moving the dust box 30.

The connection mechanism 100 may include a gear shaft 101 having the third gear 90 mounted thereto, a fourth gear 102 mounted to the gear shaft 101, a fifth gear 103 engaged with the fourth gear 102 for rotating in a direction opposite to the fourth gear 102, and a brush rotating shaft 104 having the fifth gear 103 mounted thereto and connected to the brush 40. The connection mechanism 100 may have the gear shaft 102 connected to the dust box 30 and the brush rotating shaft 104 connected both to the brush 40 and the dust box 30.

The gear shaft 101 may move linearly by the third gear 90. The gear shaft 101 may move linearly together with the third gear 90 when the third gear 90 rotates and moves. The gear shaft 101 may pass through the pass through hole 63 in the outer guide 62, and may move following the pass through hole 63 in the outer guide 62, linearly. The gear shaft 101 may have one end positioned in the second space S4 between the partition plate portion 61E and the outer guide 62. The gear shaft 101 may have the other end positioned at the filter cleaning unit 14. The gear shaft 101 may have the other end positioned at the dust box 30. The gear shaft 101 may be rotatably supported on the dust box 30. The gear shaft 101 may make the dust box 30 to move, linearly.

The fourth gear 102 may be mounted to a portion of the gear shaft 101 positioned at an outside of the outer guide 62. When the third gear 90 rotates, the fourth gear 102 may rotate together with the third gear 90 in a direction the same with a rotation direction of the third gear 90. The fourth gear 102 may rotate at a position between the outer guide 62 and the filter cleaning unit 14 protected by the outer guide 62 and the filter cleaning unit 14.

When the fourth gear 102 rotates, the fifth gear 103 may rotate together with the fourth gear 102 in a direction opposite to the fourth gear 102. The fourth gear 102 and the fifth gear 103 may be plain gears. The fifth gear 103 may rotate at a position between the outer guide 62 and the filter cleaning unit 14 protected by the outer guide 62 and the filter cleaning unit 14.

The brush rotating shaft 104 may rotate together with the fifth gear 103 when the fifth gear 103 rotates. The brush rotating shaft 104 may rotate in a direction opposite to the third gear 90, the fourth gear 101, and the gear shaft 101. The brush rotating shaft 104 may have one end positioned between the outer guide 62 and the dust box 30. The brush rotating shaft 104 may have the other end positioned in the dust box 30. The other end of the brush rotating shaft 104 may be connected to the brush 40. The brush rotating shaft 104 may be connected to the brush holder 44.

The moving mechanism supporting slit 33 shown in FIG. 6 may include a gear shaft supporting slit 33A for rotatably supporting the brush rotating shaft 104, and the gear shaft 101 may be arranged to pass through the dust box 30, specifically, the gear shaft supporting slit 33A formed in the dust box casing 31.

The moving mechanism supporting slit 33 shown in FIG. 6 may include a brush rotating shaft supporting slit 33B for rotatably supporting the brush rotating shaft 104, and the brush rotating shaft 104 may be arranged to pass through the dust box 30, specifically, the brush rotating shaft supporting slit 33B formed in the dust box casing 31.

The first holder 35 shown in FIG. 6 may couple to the dust box casing 31 for preventing the gear shaft 101 and the brush rotating shaft 104 from falling off, unintentionally.

The moving mechanism 16 may further include a shaft connection gear 110 engaged with the linear portion 52 of the first gear 50 and having the shaft 20 connected thereto. The shaft connection gear 110 may be connected one of the one pair of linear portions 51 and 52 of the first gear 50. The shaft connection gear 110 may be positioned in the first space S3 in the inside space S2 of the first gear 50, and may be connected the linear portion 52 of the one pair of linear portions 51 and 52 with which the third gear 90 is not engaged. In this case, the partition plate portion 61E may have a shaft pass through hole formed therein for pass through of the shaft 20, and the outer guide 62 may have a shaft pass through hole formed therein for pass through of the shaft 20.

The supplementary moving mechanism 18 will be described.

The supplementary moving mechanism 18 may be arranged opposite to the moving mechanism 16. The supplementary moving mechanism 18 may be connected to the moving mechanism 16 with the shaft 20, and may be connected to the filter cleaning unit 14. The supplementary moving mechanism 18, interlocked with the moving mechanism 16, may make the filter cleaning unit 14 to move along the filter 12.

The supplementary moving mechanism 18 includes a first guide gear 150 having a closed loop section shape with gear teeth formed at least one of an outside circumference and an inside circumference thereof, a supplementary gear guide 160 for guiding the first guide gear 150 to make the first guide gear 150 to rotate while maintaining at least one linear portion, a second guide gear 170 engaged with the first guide gear 150 and connected to the shaft 20, a third guide gear 190 engaged with the linear portion of the first guide gear 150, and a connection mechanism 200 connected both to the third guide gear 190 and the filter cleaning unit 14 for making the filter cleaning unit 14 to move.

The first guide gear 150 may have a structure identical to the first gear 50 of the moving mechanism 16. The first guide gear 150 may include one pair of linear portions 151 and 152 and one pair of curved portions 153 and 154. The first guide gear 150 may rotate following a locus formed at the supplementary gear guide 160. The first guide gear 150 may have one 151 of the one pair of linear portions 151 and 152 engaged with the third guide gear 190, and the other one 152 of the one pair of linear portions 151 and 152 engaged with the second guide gear 170. The first guide gear 150 may rotate following the supplementary gear guide 160 guided by the supplementary gear guide 160. When the second guide gear 170 rotates, the first guide gear 150 may have the one pair of linear portions 151 and 152 advancing in directions opposite to each other while maintaining a rectangular shape in a direction parallel to the moving direction of the filter cleaning unit 14 and the third guide gear 190 may move linearly following one 151 of the one pair of linear portions 151 and 152. The first guide gear 150 may have gear teeth formed on the inside circumference thereof, and the second guide gear 170 and the third guide gear 190 may rotate in an inside space the first guide gear 50 forms. Since configuration details of the first guide gear 150 are the same with the first gear 50 of the moving mechanism 16, detailed description of the first guide gear 150 will be omitted.

The supplementary gear guide 160 may have a function the same with the gear guide 60 of the moving mechanism 16. The supplementary gear guide 160 may be arranged opposite to the gear guide 60 of the moving mechanism 16.

The supplementary gear guide 160 may include an inner guide 161 positioned at an inside of the first guide gear 150, and an outer guide 162 surrounding an outside circumference of the first guide gear 150. The first guide gear 150 may have an inside circumference facing an outside circumference of the inner guide 161. The first guide gear 150 may have an outside circumference facing an inside circumference of the outer guide 162. The first guide gear 150 may rotate following a locus of a space formed between the inner guide 161 and the outer guide 162. The supplementary gear guide 160 may further include a gear cover 165 for shading the first guide gear 150.

The inner guide 161 of the supplementary moving mechanism 18 may have a structure identical to the inner guide 61 of the moving mechanism 16, and may be arranged in symmetry with the inner guide 61 of the moving mechanism 16. The inner guide 161 of the supplementary moving mechanism 18 may be formed smaller than the first guide gear 150. The inner guide 161 of the supplementary moving mechanism 18 may be positioned at an inside space which is a space the inside circumference of the first guide gear 150 forms.

The inner guide 161 of the supplementary moving mechanism 18 may include one pair of inner linear portions 161A and 161B opposite to each other, and one pair of inner curved portions 161C and 161D which connect the one pair of inner linear portions 161A and 161B. The inner guide 161 of the supplementary moving mechanism 18 may further include a partition plate portion 161E for partitioning the inside space of the first guide gear 150. The partition plate portion 161E may partition the inside space of the first guide gear 150 into a third space in which the second guide gear 170 is positioned, and a fourth space in which the third guide gear 190 is positioned. The one pair of inner linear portions 161A and 161B and the one pair of inner curved portions 161C and 161D may be formed along an outside circumference of the partition plate portion 161E. The inner guide 161 of the supplementary moving mechanism 18 may have a width of one 161A of the one pair of inner linear portions 161A and 161B formed smaller than a width of the other one 161B. The linear portion 161A of the one pair of inner linear portions 161A and 161B having a smaller width may have one of an upper side and a lower side of a space the third guide gear 90 is positioned therein opened. The inner guide 161 of the supplementary moving mechanism 18 may have an avoiding portion formed recessed at a position matched to the second guide gear 170 for avoiding the second guide gear 170. Since details of the inner guide 161 of the supplementary moving mechanism 18 are identical to the inner guide 61 of the moving mechanism 16, description of the details will be omitted.

The outer guide 162 of the supplementary moving mechanism 18 may have a structure identical to the outer guide 62 of the moving mechanism 16 and may be mounted in symmetry with the outer guide 62 of the moving mechanism 16. The outer guide 162 of the supplementary moving mechanism 18 may have a pass through hole 163 formed therein in parallel to the moving direction of the filter cleaning unit 14 for pass through of the connection mechanism 200. Since details of the outer guide 162 of the supplementary moving mechanism 18 are identical to the outer guide 62 of the moving mechanism 16, description of the details will be omitted.

The gear cover 165 of the supplementary moving mechanism 18 may couple to the outer guide 162 of the supplementary moving mechanism 18. The gear cover 165 of the supplementary moving mechanism 18 may form an exterior appearance of the supplementary moving mechanism 18 together with the outer guide 162 of the supplementary moving mechanism 18. Different from the gear cover 65 of the moving mechanism 16, the gear cover 165 of the supplementary moving mechanism 18 may have no drive source mounted thereto, and the gear cover 165 of the supplementary moving mechanism 18 may have no configuration formed thereon for mounting the drive source thereto. Since details of the gear cover 165 of the supplementary moving mechanism 18 are identical to details of the gear cover 65 of the moving mechanism 16 except that the gear cover 165 of the supplementary moving mechanism 18 has no drive source mounted thereto, description of the details will be omitted.

The outer guide 162 and the gear cover 165 may function as a case of the supplementary moving mechanism 18. The inner guide 161 of the supplementary moving mechanism 18 may be positioned between the outer guide 162 and the gear cover 165 of the supplementary moving mechanism 18 for guiding rotation of the first guide gear 150. The inner guide 161 of the supplementary moving mechanism 18 may partition the inside space of the first guide gear 150 into a third space and a fourth space. The supplementary moving mechanism 18 may have the gear cover 165, the inner guide 161, and the outer guide 162 coupled with fastening members, such as screws. Each of the gear cover 165, the inner guide 161, and the outer guide 162 may have a fastening hole formed therein for pass through of the fastening member, such as the screw.

The second guide gear 170 may be positioned at a position matched with the shaft connection gear 110 of the moving mechanism 16 in symmetry with the shaft connection gear 110 of the moving mechanism 16. The second guide gear 170 may have a function the same with a function of the second gear 70 of the moving mechanism 16. The second guide gear 170 may function as a drive gear for rotating the first guide gear 150 of the supplementary moving mechanism 18. The second guide gear 170 may be rotated in a rotation direction the same with the shaft connection gear 110 of the moving mechanism 16. The second guide gear 170 may rotate the first guide gear 150 in a state the second guide gear 170 is fixed to the third space in the inside space of the first guide gear 50 in view of a position.

The third guide gear 190 may have a structure identical to the third gear 90 of the moving mechanism 16. The third guide gear 190 may be a moving gear moved according to the first guide gear 150 while rotated by the first guide gear 150. The third guide gear 190 may be mounted in symmetry with the third gear 90 of the moving mechanism 16. The third guide gear 190 may be a driven gear for transmission of a torque from the first guide gear 150 to the connection mechanism 200 when the first guide gear 150 rotates. The third guide gear 190 may have at least a portion movably positioned to move a position thereof in the fourth space of the inside space of the first guide gear 150. The third guide gear 190 may have a gear portion having gear teeth formed thereon engaged with the first guide gear 150 in the fourth space.

The connection mechanism 200 of the supplementary moving mechanism 18 may have a structure identical to the structure of the connection mechanism 100 of the moving mechanism 16. The connection mechanism 200 of the supplementary moving mechanism 18 may be mounted in symmetry with the connection mechanism 100 of the moving mechanism 16. The connection mechanism 200 of the supplementary moving mechanism 18 may include a gear shaft 201, a fourth gear 202 mounted to the gear shaft 201, a fifth gear 203 engaged with the fourth gear 202 to rotate in a direction opposite to the fourth gear 202, and a brush rotating shaft 204 connected to the brush 40 to have the fifth gear 203 mounted thereto. The connection mechanism 200 of the supplementary moving mechanism 18 may have the gear shaft 201 connected to the dust box 30, and the brush rotating shaft 204 connected both to the brush 40 and the dust box 30.

The gear shaft 201 of the supplementary moving mechanism 18 may rotate and move in a direction the same with the third guide gear 190. The gear shaft 201 of the supplementary moving mechanism 18 may be arranged in symmetry with the gear shaft 201 of the moving mechanism 16.

The fourth gear 202 of the supplementary moving mechanism 18 may rotate and move in a direction the same with the gear shaft 201. The fourth gear 202 of the supplementary moving mechanism 18 may be positioned in symmetry with the fourth gear 102 of the moving mechanism 16.

The fifth gear 203 of the supplementary moving mechanism 18 may rotate in a direction opposite to the fourth gear 202, and may move in a direction the same with the fourth gear 202. The fifth gear 203 of the supplementary moving mechanism 18 may be positioned in symmetry with the fifth gear 103 of the moving mechanism 16.

The brush rotating shaft 204 of the supplementary moving mechanism 18 may rotate and move in a direction the same with the fifth gear 203. The brush rotating shaft 204 of the supplementary moving mechanism 18 may be arranged in symmetry with the brush rotating shaft 104 of the moving mechanism 16.

The moving mechanism supporting slit 34 shown in FIG. 6 may include a gear shaft supporting slit 34A for rotatably supporting the gear shaft 201 of the supplementary moving mechanism 18, and the gear shaft 201 of the supplementary moving mechanism 18 may be arranged to pass through the dust box 30, specifically, the gear shaft supporting slit 34A formed in the dust box casing 31.

The moving mechanism supporting slit 34 shown in FIG. 6 may include a brush rotating supporting slit 34B for rotatably supporting the brush rotating shaft 204 of the supplementary moving mechanism 18, and the brush rotating shaft 204 of the supplementary moving mechanism 18 may be arranged to pass through the dust box 30, specifically, the brush rotating shaft supporting slit 34B formed in the dust box casing 31.

The second holder 36 shown in FIG. 6 may be coupled to the dust box casing 31 for preventing the gear shaft 201 and the brush rotating shaft 204 from falling off, unintentionally. Since the connection mechanism 200 of the supplementary moving mechanism 18 has a structure identical to the connection mechanism 100 of the moving mechanism 16 and is mounted in symmetry with the connection mechanism 100 of the moving mechanism 16, and has detailed configuration identical to the connection mechanism 100 of the moving mechanism 16, description of the detailed configuration will be omitted.

The operation of the air conditioner in accordance with a preferred embodiment of the present invention having the foregoing configuration will be described.

If the drive source 80 is in operation, the second gear 70, connected to the drive source 80, may be rotated in a state a position of the second gear 70 is fixed. When the second gear 70 rotates, the first gear 50 may have the linear portion 52 thereof engaged with the second gear 70 moved linearly by the second gear 70 such that the first gear 50 may have the one pair of linear portions 51 and 52 moved in directions opposite to each other linearly while maintaining a whole shape of the first gear 50. When the linear portion 52 engaged with the second gear 70 moves in a right side direction X1 on FIG. 8 linearly, the linear portion 51 engaged with the third gear 90 may move in a left side direction X2 on FIG. 8, linearly. Opposite to this, when the linear portion 52 engaged with the second gear 70 moves in the left side direction X2 on FIG. 8 linearly, the linear portion 51 engaged with the third gear 90 may move in the right side direction X1 on FIG. 8, linearly. The one pair of linear portions 51 and 52 may have portions which have maintained linear shapes changed to shapes of the curved portions 53 and 54, and portions which have maintained curved shapes changed to shapes of the linear portions 51 and 52.

When the linear portion 51 having the third gear 90 engaged thereto moves linearly, the third gear 90 may rotate in a direction the same with the second gear 70. In this case, the third gear 90 may be moved linearly in a direction opposite to a direction of advance of the linear portion 51 the third gear 90 is engaged therewith. When the third gear 90 moves linearly while rotating, the gear shaft 101 moves linearly together with the third gear 90 while rotating in a direction the same with the third gear 90. When the gear shaft 101 moves linearly while rotating, the fourth gear 102 may move linearly together with the third gear 90 while rotating together with the gear shaft 102. When the fourth gear 102 rotates, the fifth gear 104 may rotate in a direction opposite to the third gear 90 and the fourth gear 102. The fifth gear 104 may advance in a direction the same with the fourth gear 102, when the brush 40 may rotate in a direction the same with the fifth gear 103 while advancing in a direction parallel to a direction of advance of the fifth gear 102, and the brush body 42 may collect the foreign matter from the filter 12 while rotating in a regular direction toward a direction the brush 40 advances. When the brush 40 moves, the dust box 30 may move together with the brush 40 in the same direction with the brush 40, to receive the foreign matter separated from the filter 12. The supplementary moving mechanism 18 may make the brush 40 to rotate and move from a side opposite to the moving mechanism 16, and may make the dust box 30 to move in the same direction, linearly.

A case will be described in detail, in which the filter cleaning unit 14 moves in the right side direction X1 on FIGS. 8 and 9, linearly.

When the second gear 70 rotates in an anti-clockwise direction, the linear portion 52 engaged with the second gear 70 may advance in the right side direction X1 on FIGS. 8 and 9, and the linear portion 51 having the third gear 90 engaged therewith may advance in the left side direction X2 on the FIGS. 8 and 9. When the third gear 90 advances in the left side direction X2 of the linear portion 51 having the third gear 90 engaged therewith, the third gear 90 may advance in the right side direction X1 on the FIGS. 8 and 9 while rotating in the anti-clockwise direction. When the third gear 90 advances in the right side direction X1 on the FIGS. 8 and 9 while rotating in the anti-clockwise direction, the gear shaft 101 and the fourth gear 102 may advance in the right side direction X1 on FIGS. 8 and 9 while rotating in the anti-clockwise direction, and the fifth gear 103 and the brush rotating shaft 104 may advance in the right side direction X1 on FIGS. 8 and 9 while rotating in the clockwise direction. The filter cleaning unit 14 may have the dust box 30 advancing in the right side direction X1 on FIGS. 8 and 9. The filter cleaning unit 14 may have the brush 40 rotated in the clockwise direction, and the brush body 42 headed for the left side on FIGS. 8 and 9 may rotate to head for the right side on FIGS. 8 and 9 after rotating to head for an upper side on FIG. 8. Thereafter, the brush body 42 may rotate to head for the left side on FIGS. 8 and 9 after rotated to head for a lower side on FIG. 8.

A case will be described in detail, in which the filter cleaning unit 14 moves in the left side direction X2 on FIGS. 8 and 9, linearly.

When the second gear 70 rotates in the clockwise direction, the linear portion 52 engaged with the second gear 70 may advance in the left side direction X2 on FIGS. 8 and 9, and the linear portion 51 having the third gear 90 engaged therewith may advance in the right side direction X1 on FIGS. 8 and 9. When the linear portion 51 having the third gear 90 engaged therewith advances in the right side direction X1, the third gear 90 may advance in the left side direction X2 on FIGS. 8 and 9 while rotating in the clockwise direction. When the third gear 90 may advance in the left side direction X2 on FIGS. 8 and 9 while rotating in the clockwise direction, the gear shaft 101 and the fourth gear 102 may advance in the left side direction X2 on FIGS. 8 and 9 while rotating in the clockwise direction, and the fifth gear 103 and the brush rotating shaft 104 may advance in the left side direction X2 on FIGS. 8 and 9 while rotating in the anti-clockwise direction. The filter cleaning unit 14 may have the dust box 30 advancing in the left side direction X2 on FIGS. 8 and 9. The filter cleaning unit 14 may have the brush 40 rotating in the anti-clockwise direction, and the brush body 42 headed for the right side on FIGS. 8 and 9 rotates to head for the left side on FIGS. 8 and 9 after rotated to head for the upper side on FIG. 8. Thereafter, the brush body 42 may be rotated to head for the right side on FIGS. 8 and 9 after rotated to head for the lower side on FIG. 8.

Figure 10:
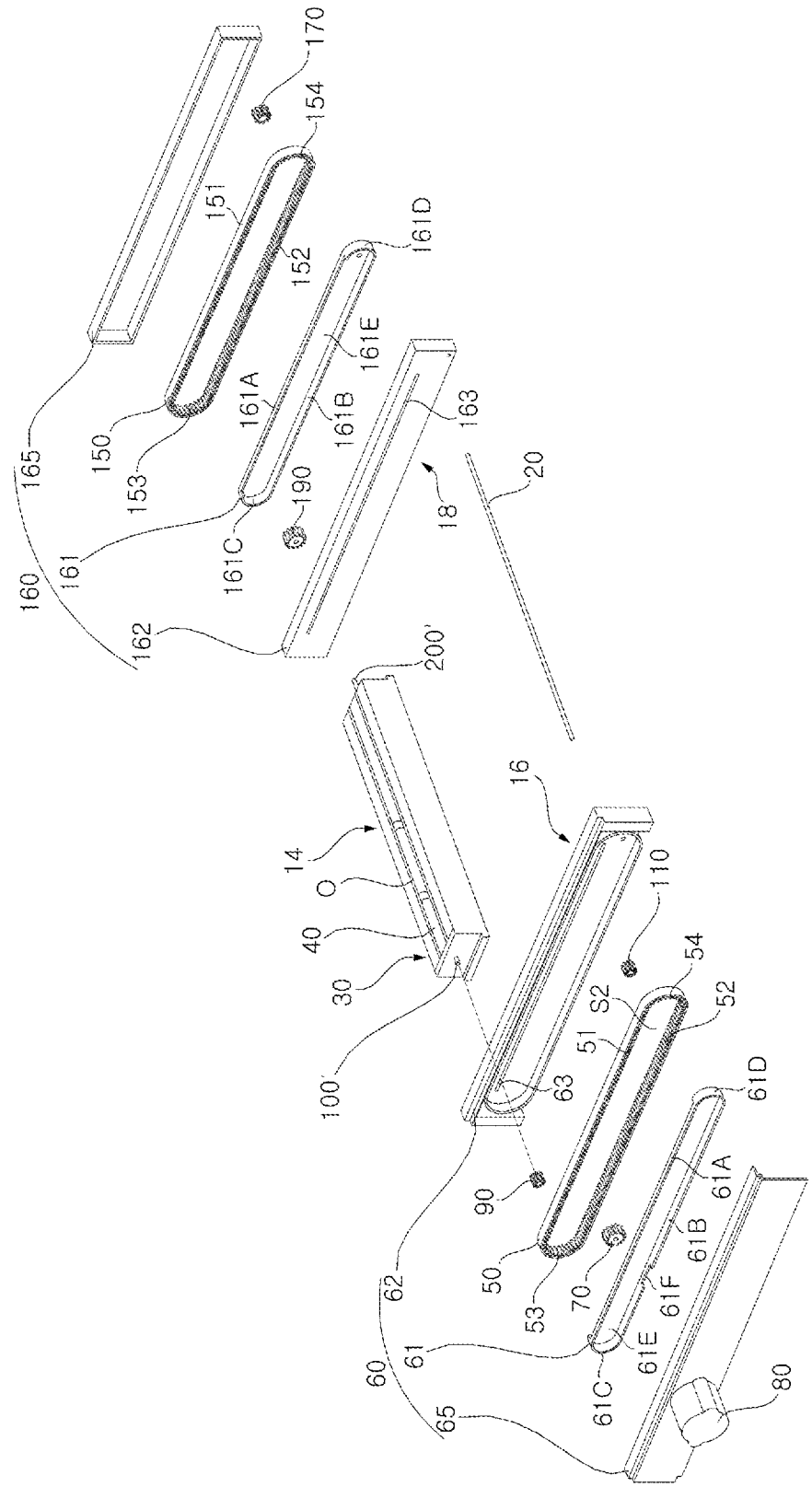
FIG. 10 is an exploded perspective view illustrating a moving mechanism and a supplementary moving mechanism in an air conditioner in accordance with another preferred embodiment of the present invention.
Figure 11:
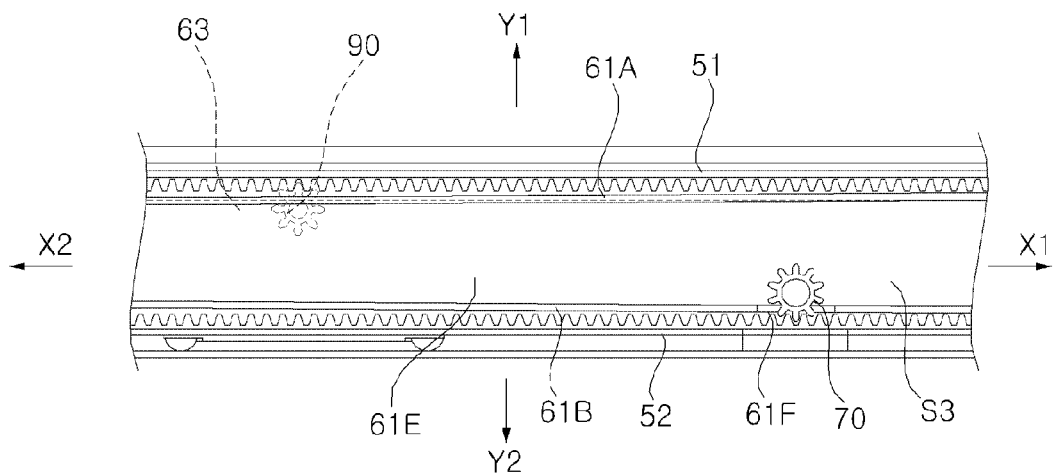
FIG. 11 is an enlarged side view illustrating principal parts of a moving mechanism in an air conditioner in accordance with another preferred embodiment of the present invention.
Figure 12:
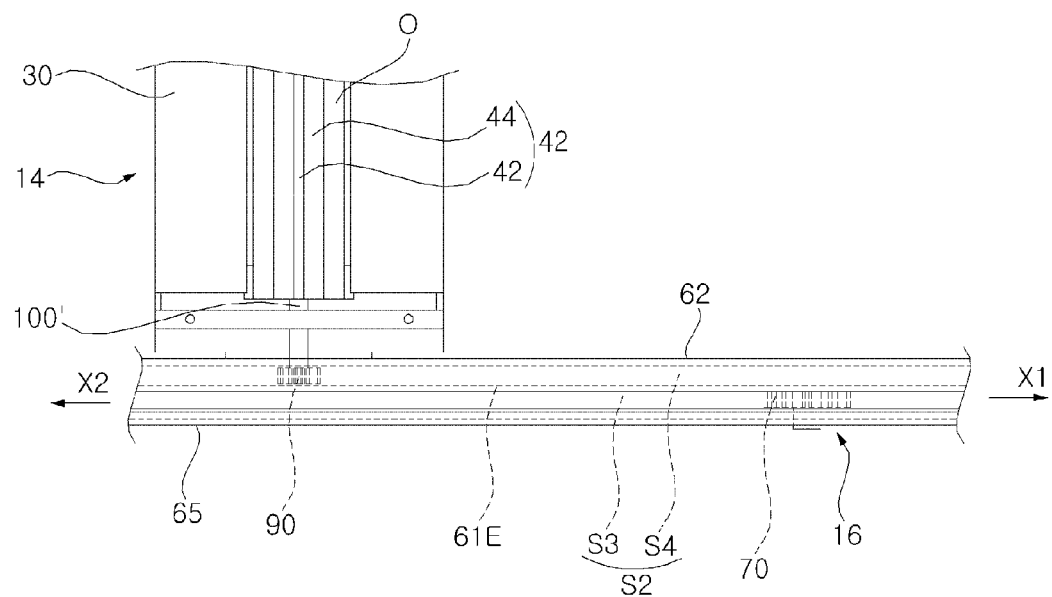
FIG. 12 is an enlarged side view illustrating principal parts of a moving mechanism in an air conditioner in accordance with another preferred embodiment of the present invention.

FIG. 10 is an exploded perspective view illustrating a moving mechanism and a supplementary moving mechanism in an air conditioner in accordance with another preferred embodiment of the present invention, FIG. 11 is an enlarged side view illustrating principal parts of a moving mechanism in an air conditioner in accordance with another preferred embodiment of the present invention, and FIG. 12 is an enlarged side view illustrating principal parts of a moving mechanism in an air conditioner in accordance with another preferred embodiment of the present invention.

The air conditioner in accordance with another preferred embodiment of the present invention includes a connection mechanism having at least one brush rotating shaft 100' and 200' connected to the brush 40 and rotatably supported on the dust box 30. Since other configurations and operation of the air conditioner in accordance with another preferred embodiment of the present invention are identical, or similar, to the air conditioner in accordance with the preferred embodiment of the present invention except that the connection mechanism has at least one brush rotating shaft 100' and 200', the same reference symbols will be used and detailed description thereof will be omitted.

The third gear 90 of a guide mechanism 16 may be mounted to the brush rotating shaft 100', and the brush rotating shaft 100' may rotate in a direction the same with a rotation direction of the third gear 90. The brush rotating shaft 100' may move in a direction the same with the third gear 90, linearly.

The brush rotating shaft 100' may pass through the pass through hole 63 in the outer guide 62, and may move along the pass through hole 63 in the outer guide 62, linearly. The brush rotating shaft 100' may have one end positioned in the second space S4 between the partition plate portion 61E and the outer guide 62. The brush rotating shaft 100' may have the other end positioned in the dust box 30. The brush rotating shaft 100' may have the other end connected to the brush 40. The brush rotating shaft 100' may be rotatably connected to the brush holder 35.

The third gear 90 of the guide mechanism 16 may be connected to the brush 40 with the brush rotating shaft 100', and the brush 40 may be rotated by the brush rotating shaft 100' in a direction the same with the third gear 90. The guide mechanism 16 of the embodiment does not include the gear shaft 101, the fourth gear 102 and the fifth gear 103 of the embodiment of the present invention, enabling to rotate the brush 40 with a simple structure.

A third guide gear 190 of a supplementary guide mechanism 18 is mounted to a brush rotating shaft 200', and the brush rotating shaft 200' may rotate in a direction the same with the third guide gear 190. The brush rotating shaft 200' may move in a direction the same with the third guide gear 190, linearly.

The brush rotating shaft 200' may pass through a pass through hole 163 in the outer guide 162, and may move along the pass through hole 163 in the outer guide 162, linearly. The brush rotating shaft 200' may have one end positioned in a fourth space between the partition plate portion 161E and the outer guide 162. The brush rotating shaft 200' may have the other end positioned in the dust box 30. The brush rotating shaft 200' may have the other end connected to the brush 40. The brush rotating shaft 200' may be rotatably connected to the brush holder 36.

The third gear 190 of the supplementary guide mechanism 18 may be connected to the brush 40 with the brush rotating shaft 200', and the brush 40 may be rotated in a direction the same with the third guide gear 190 by the brush rotating shaft 200'. The supplementary guide mechanism 18 of the present embodiment does not include the gear shaft 201, the fourth gear 202, and the fifth gear 203 of the embodiment of the present invention, enabling to rotate the brush 40 with a simple structure and least number of components.

The operation of the present embodiment will be described.

When the drive source 80 is in operation, the first gear 50, the second gear 70, and the third gear 90 may rotate the same with the embodiment of the present invention, and the brush rotating shaft 100' may be rotated in a direction the same with the third gear 90 in a state the brush rotating shaft 100' is connected to the third gear 90. While rotating in a direction the same with the third gear 90 and the brush rotating shaft 100', the brush 40 may advance in a direction parallel to a direction of advance of the third gear 90. In this case, the brush body 42 may rotate reversely in a direction opposite to a direction of advance of the brush 40 for collecting the foreign matter from the filter 12. In the meantime, when the brush 40 moves, the dust box 30 may be moved in a direction the same with the brush rotating shaft 100' by the brush rotating shaft 100' linearly, enabling to receive the foreign matter separated from the filter 12. The supplementary guide mechanism 18 may make the brush 40 to rotate and move from an opposite side of the guide mechanism 16, and may make the dust box 30 to move in the same direction, linearly.

A case will be described in detail, in which the filter cleaning unit 14 moves in the right side direction X1 on FIGS. 11 and 12, linearly.

When the third gear 90 advances in the right side direction X1 on FIGS. 11 and 12 while rotating in the anti-clockwise direction, the brush rotating shaft 100' may advance in the right side direction X1 on FIGS. 11 and 12 while rotating in the anti-clockwise direction. The filter cleaning unit 14 may have the dust box 30 advancing in the right side direction X1 on FIGS. 11 and 12 by the brush rotating shaft 100'. The filter cleaning unit 14 may have the brush 40 rotating in the anti-clockwise direction, and the brush body 42 headed for the left side on FIGS. 11 and 12 may be rotated to head for the right side on FIGS. 11 and 12 after rotated to head for the lower side direction Y2 on FIG. 11. Thereafter, the brush body 42 may be rotated to head for the left side on FIGS. 11 and 12 after rotated to head for the upper side on FIG. 8.

A case will be described in detail, in which the filter cleaning unit 14 moves in the left side direction X2 on FIGS. 11 and 12, linearly.

When the third gear 90 advances in the left side direction X2 on FIGS. 11 and 12 while rotating in the clockwise direction, the brush rotating shaft 100' may advance in the left side direction X2 on FIGS. 11 and 12 while rotating in the clockwise direction. The filter cleaning unit 14 may have the dust box 30 advancing in the right side direction X1 on FIGS. 11 and 12 by the brush rotating shaft 100'. The filter cleaning unit 14 may have the dust box 30 advancing in the left side direction X1 on FIGS. 11 and 12 by the brush rotating shaft 100'. The filter cleaning unit 14 may have the brush 40 rotating in the clockwise direction, and the brush body 42 headed for the right side on FIGS. 11 and 12 may be rotated to head for the left side on FIGS. 11 and 12 after rotated to head for the lower side on FIG. 11. Thereafter, the brush body 42 may be rotated to head for the right side on FIGS. 11 and 12 after rotated to head for the upper side on FIG. 11.

It will be apparent to those skilled in the art that the present invention is not intended to be limited to the above-described embodiment and drawings, and various changes or modifications may be made therein without departing from the scope and the technical sprit of the present invention.

What is claimed is:

1. An air conditioner comprising:
a filter;
a filter cleaning head having a space formed therein to receive foreign matter separated from the filter;
a moving transmission configured to move the filter cleaning head along the filter, wherein the moving transmission includes:
a first gear having a closed loop section with gear teeth formed on at least one of an outside circumference or an inside circumference thereof,
a gear guide that holds the first gear during its movement, the gear guide being configured to maintain at least one linear portion of the first gear,
a second gear engaged with the first gear,
a drive motor to cause the second gear to rotate, the rotating of the second gear causing the movement of the first gear along the gear guide, and
a third gear engaged with the linear portion of the first gear to move linearly along the linear portion while rotating based on the movement of the first gear; and
a connection transmission connected to the third gear and the filter cleaning head to cause the filter cleaning head to move based on the rotation of the third gear.

2. The air conditioner as claimed in claim 1, wherein the gear guide includes an inner guide positioned on an inside of the first gear.

3. The air conditioner of claim 2, wherein the gear guide further comprises an outer guide surrounding the outside circumference of the first gear.

4. The air conditioner as claimed in claim 2, wherein the inner guide includes;
one pair of inner linear portions opposite to each other, and
one pair of inner curved portions connecting the inner linear portions.

5. The air conditioner as claimed in claim 4, wherein the inner guide further includes a partition plate portion between the pair of inner linear portions.

6. The air conditioner as claimed in claim 5, wherein the partition plate portion is positioned to partition an inside space of the first gear into a first space on one side of the partition plate portion and a second space on the opposite side of the partition plate portion.

7. The air conditioner of claim 6, wherein the second gear is positioned in the first space and the third gear is positioned in the second space.

8. The air conditioner as claimed in claim 5, wherein the one pair of inner linear portions and the one pair of inner curved portions are formed along an outside circumference of the partition plate portion.

9. The air conditioner as claimed in claim 5, wherein one of the one pair of inner linear portions have a width smaller than a width of the other one of the one pair of inner linear portions.

10. The air conditioner as claimed in claim 3, wherein the outer guide includes at least one outer linear portion facing the inner linear portion and spaced from the inner linear portion.

11. The air conditioner of claim 3, wherein the outer guide has a pass through hole formed therein parallel to a moving direction of the filter cleaning head and configured to receive a portion of the connection transmission.

12. The air conditioner of claim 3, wherein the gear guide further includes a gear cover coupled to at least one of the inner guide or the outer guide to protect the first gear.

13. The air conditioner as claimed in claim 12, wherein the drive motor is mounted to the gear cover.

14. The air conditioner of claim 1, further comprising a supplemental moving transmission positioned opposite to the moving transmission, relative to the filter cleaning head, the supplemental moving transmission being connected to the moving transmission via a shaft and being connected to the filter cleaning head.

15. The air conditioner as claimed in claim 14, wherein the moving transmission further includes a shaft connection gear engaged with the first gear, the shaft connection gear having the shaft connected thereto.

16. The air conditioner as claimed in claim 15, wherein the supplemental moving transmission includes;
a first guide gear having a closed loop section with gear teeth formed on at least one of an outside circumference or an inside circumference thereof,
a supplemental gear guide that holds the first guide gear during its movement, the supplemental gear guide being configured to maintain at least one linear portion of the first guide gear,
a second guide gear engaged with the first guide gear, and
a second connection transmission engaged with the first guide gear and connected to the filter cleaning head to move the filter cleaning head.

17. The air conditioner of claim 16, wherein the supplemental moving transmission further includes a third guide gear engaged with the linear portion of the first guide gear, and
wherein the second connection transmission is further connected to the third guide gear to cause the filter cleaning head to move.

18. The air conditioner of claim 1, wherein the filter cleaning head includes;
a dust box having the space formed therein, and
a brush rotatably positioned at the dust box in contact with the filter,
wherein the connection transmission is further connected to the brush to rotate the brush.

19. The air conditioner as claimed in claim 18, wherein the connection transmission further includes:
a gear shaft having the third gear mounted thereto,
a fourth gear mounted to the gear shaft,
a fifth gear engaged with the fourth gear to be rotated in a direction opposite to the fourth gear, and
a brush rotating shaft mounted to the fifth gear connected to the brush.

20. The air conditioner as claimed in claim 18, wherein the connection transmission further includes a brush rotating shaft having the third gear mounted thereto, connected to the brush and rotatably supported by the dust box.

21. The air conditioner as claimed in claim 18, wherein the dust box includes;
- a dust box casing having a foreign matter inlet formed therein, and
- a separable case detachable from the dust box casing for receiving the foreign matter in a space formed therein.

* * * * *